United States Patent [19]

Anderson

[11] Patent Number: 5,024,575

[45] Date of Patent: Jun. 18, 1991

[54] LIGHTWEIGHT GRIPPER FOR ROBOTIC TRANSFER OPERATIONS

[75] Inventor: Roger Anderson, Ridgefield, Conn.

[73] Assignee: Robotic Originals, Inc., Danbury, Conn.

[21] Appl. No.: 405,634

[22] Filed: Sep. 8, 1989

[51] Int. Cl.$^5$ .................................................. B65G 61/00
[52] U.S. Cl. .................................. 414/627; 294/81.2; 294/81.5; 414/618; 414/737
[58] Field of Search ................ 414/627, 618, 733, 737; 294/81.2, 81.21, 81.5, 81.6, 81.61, 65, 2; 403/170, 172; 901/40, 39; 221/211; 271/108

[56] References Cited

U.S. PATENT DOCUMENTS

| | | | |
|---|---|---|---|
| 1,846,038 | 2/1932 | Owens | 294/81.21 |
| 3,031,906 | 5/1962 | Holman | 414/627 X |
| 3,306,646 | 2/1967 | Flora | 294/81.6 X |
| 3,610,673 | 10/1971 | Strombeck et al. | 294/81.6 X |
| 3,860,280 | 1/1975 | Karlsson | 294/81.1 X |
| 4,685,714 | 8/1987 | Hoke | 294/81.2 |
| 4,723,353 | 2/1988 | Monforte | 901/39 X |
| 4,744,595 | 5/1988 | Tonning et al. | 294/65 |

FOREIGN PATENT DOCUMENTS 8302282  6/1983  Netherlands ..................... 294/81.2

Primary Examiner—Joseph E. Valenza
Assistant Examiner—Keith L. Dixon
Attorney, Agent, or Firm—Schweitzer Cornman & Gross

[57] ABSTRACT

A product gripper mechanism, particularly for gripping a plurality of products in a product group, such as bakery products, for transfer to and loading into a shipping basket or tray. The gripper is constructed of a material, such as rigid PVC tubing, which is easily obtainable, lightweight and of substantial strength. The gripper frame includes spaced-apart lateral supports, which carry a plurality of adjustably positionable cross members carrying suction devices. The suction devices are adjustably positionable on the cross members, and may easily be added to or removed from the cross members. The assembly of the tubing elements is such as to accommodate rapid disassembly and reassembly, in order to reconfigure the gripper for different product types. The gripper has pivoting end flaps of L-shaped configuration provided with thin, flexible, inwardly projecting bottom plates. The bottom plates are arranged, when the end flaps are closed, to slide underneath end portions of the product items to help support the product when the gripper is accelerated upwardly to transfer the packages from the pick up location to the load station.

11 Claims, 1 Drawing Sheet

LIGHTWEIGHT GRIPPER FOR ROBOTIC TRANSFER OPERATIONS

BACKGROUND AND SUMMARY OF THE INVENTION

For certain operations, among them the loading of packaged bakery products into shipping baskets or trays, it is advantageous to employ robotic transfer devices for picking up pre-arranged groups of packages from a delivery location and transferring them to a loading station. At the loading station, the robotic device may reorient the package group and deposit the packages in one or more operations in the shipping basket. Each type of product has an optimum loading pattern in the shipping basket, typically with certain of the product items (e.g., loaves of bread) oriented in one direction and others oriented in another direction. Such pattern loading of the shipping baskets is common in the commercial baking for example.

In order to effectively carry out pattern loading operations with robotic devices, the robotic device, together with the gripping means for the product, may have to execute a series of translational and rotational movements at relatively high speed, such that lightweight construction of the gripper is an important priority. In addition, because product packages of different sizes require different numbers of packages to be loaded into a shipping tray, typically with more than one product orientation, a product gripping device must be easily reconfigurable, so that the gripping device may be quickly adapted to the particular product being delivered to the shipping area. In a typical bakery operation, for example, the product type may change relatively frequently not only between different package sizes, but also between different product types (e.g., bread, rolls, etc.)

Pursuant to the present invention, a novel and advantageous form of robotically mounted gripper device is provided which is of very lightweight yet strong construction, ideally suited for the relatively high translational and orientational accelerations imposed upon it during high speed loading operations. Moreover, the construction of the gripping device is such that it may be quickly and easily disassembled and reassembled and/or adjusted, as necessary, to accommodate product groupings of various types.

In accordance with one specific aspect of the invention, a frame structure for the gripper device is formed of conventional rigid plastic tubing, such as commercially available, low cost PVC tubing. The basic frame structure includes a pair of spaced-apart, longitudinally extending tubular frame sections arranged to be mounted on a robotic device or the like. These spaced members form lateral supports for a plurality of cross members, each mounting a plurality of package-engaging suction devices. The cross members advantageously may be formed of rigid PVC tubing or the like, joined at each end by conventional T-shaped fittings. The cross bar portions of the T-shaped fittings are machined through, so that the fittings are slideably received over the lateral supports and can be adjustably positioned thereon and secured by thumbscrews or the like.

Pursuant to the invention, the individual cross members mount a plurality of tubular supports, carrying individual suction devices. The tubular supports are slideably adjustable along the cross members and may be secured in adjusted positions by means such as thumbscrews or the like.

In accordance with another specific aspect of the invention, the gripper assembly as a whole, formed principally of sections of PVC tubing joined by T-shaped and L-shaped fittings, is arranged with selected components permanently joined and others arranged for free assembly and disassembly. Accordingly, as and when necessary, the entire gripper frame structure may be disassembled in a few minutes time and reconfigured with additional or fewer cross members and more or fewer suction devices mounted on the several cross members, all as may be indicated by the particular type and size of product to be handled. When the type or size of product being delivered to the robotic station is changed, the gripping device may be quickly reconfigured to accommodate a new pattern of products and/or a greater or lesser number thereof.

Pursuant to another feature of the invention, the gripping device is provided on its opposite ends with retractable L-shaped flaps confining pivotally secured to the end members of the gripper frame. When the various product items at the delivery station have been engaged by suction devices, the end flaps are closed, causing the package group to be confined across the two ends of the gripper and also underneath. This enables the package group to better withstand the accelerations imposed thereon during the subsequent lifting, translating and rotating movements exerted upon the gripper by the associated robotic device. In this respect, the products may typically be contained in plastic bags which are engaged and gripped in a limited area by a suction device. Physical confinement of the packages during transfer presents or reduces swinging of the packages and thus enables higher rates of acceleration to be utilized.

For a better understanding of the above and other features and advantages of the invention, reference should be made to the following detailed description of a preferred embodiment of the invention and to the accompanying drawings.

DESCRIPTION OF A PREFERRED EMBODIMENT

Figure 1:
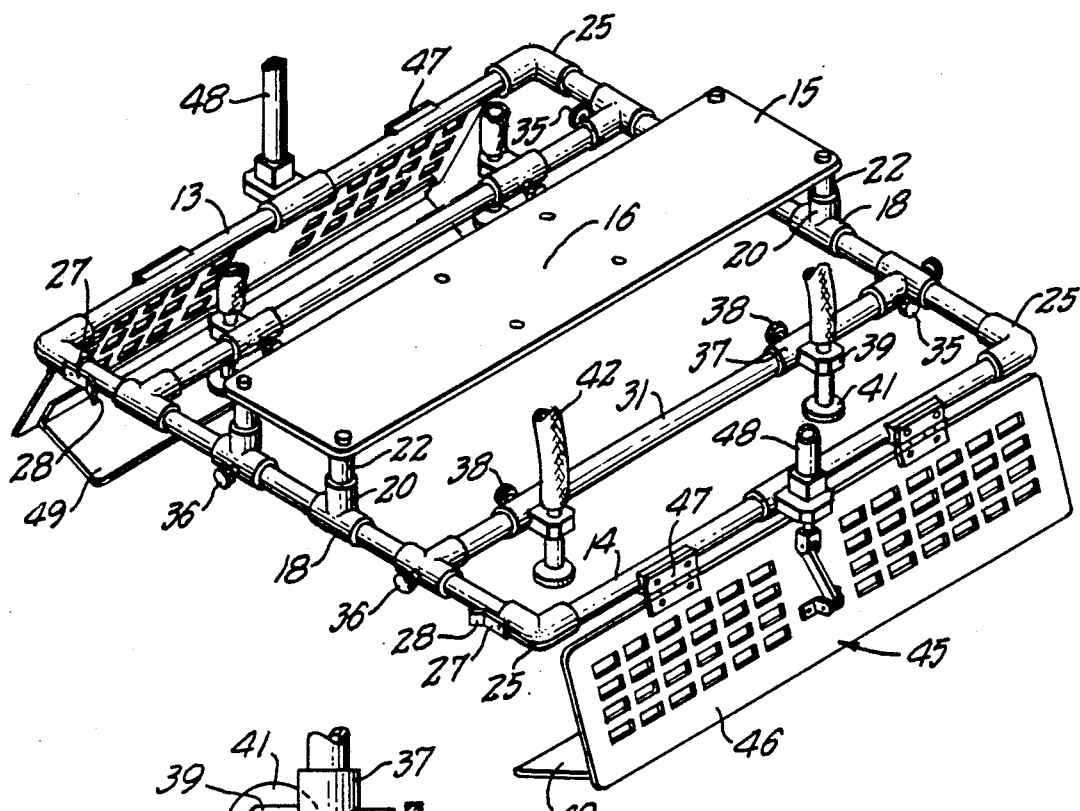
FIG. 1 is a perspective view of the new robotic gripper device of the invention.

Referring now to the drawing, the reference numeral 10 designates generally the gripper frame, which comprises spaced, longitudinally extending lateral support members 11, 12 and spaced apart end members 13, 14 extending between the two lateral supports. To particular advantage, the basic frame structure, as well as other elements of the mechanism, are formed of a material such as rigid PVC tubing, which is both lightweight and relatively strong and which, moreover, is easy to utilize in the fabrication of a structure.

In the illustrated arrangement, a mounting plate 15 is provided, which is designed for attachment to a suitable robotic device (not shown). The contemplated robotic device attaches to the center area 16 of the mounting plate, and includes provisions for lifting and lowering, horizontal translation, and rotational reorientation. Robotic devices suitable for this purpose are known and commercially available, and do not form part of this invention. A particularly advantageous form of robotic device, however, is that described in my copending U.S. application Ser. No. 404,942, filed Sept. 8, 1989.

In the illustrated arrangement, the lateral support elements 11, 12 are provided in their central portions with spaced apart, T-shaped fittings 17, 18. These T-shaped fittings may be conventional, commercially available fittings for the PVC tubing. As commercially available, these T-shaped fittings are provided with shouldered recesses (not shown) for receiving end portions of PVC tube sections to a predetermined depth within the fitting. Pursuant to the construction of this invention, however, the cross bar portions 19 of the T-shaped fittings are internally machined, so that the lateral frame sections 12 can pass entirely through the cross bar portions 19 of the fittings. The stem portions 20 of the fitting 17, 18 receive short, vertically extending sections 21, 22 of PVC tubing, and these sections advantageously may be permanently bonded to the fittings 17, 18. Typically, a solvent adhesive is applied to one or both of the parts immediately before assembly, providing a quick and effective permanent bond. The upper ends of the tube sections 21, 22 are plugged and arranged to receive screws 23 for securing the mounting plate 15.

The fittings 17, 18 and their respective vertically extending tube sections 21, 22 are duplicated on opposite sides, for each of the laterally extending supports 11, 12, as is apparent in FIG. 1.

Figure 2:
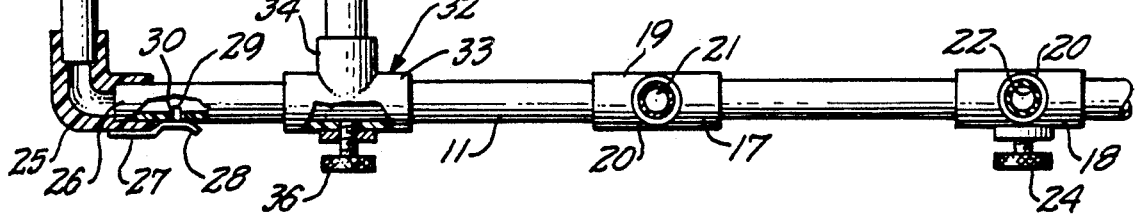
FIG. 2 is an enlarged, fragmentary view of the gripper mechanism of FIG. 1, with parts broken away to illustrate details of construction.

To advantage, at least one of the T-shaped fittings 17 or 18 (in this illustration the fittings 17), are either permanently fixed to their respective lateral supports 11, 12, or are arranged to be normally fixed thereto. Preferably, the fittings are permanently fixed, as by means of conventional solvent adhesive, for example. At the same time, the other set 18 of the T-shaped fittings is arranged to be movably associated with the respective lateral support members 11, 12. As reflected particularly in FIG. 2, the fittings 18 may be provided with thumbscrew elements 24, threadedly engaged with the fittings and arranged to bear against the side wall of the tubular support elements 11, 12, in order to temporarily secure the fittings 18 in predetermined positions on the support members 11, 12. As will be evident hereinafter, the movability of the second set of T-shaped fittings 18 enables expeditious reconfiguration of the gripping device as and when desirable.

The end members 13, 14 of the frame are connected to the lateral supports 11, 12 by means of elbow fittings 25. These fittings may be conventional, commercially available fittings for the rigid PVC tubing, and advantageously these are permanently bonded to the end frame members 13, 14, at each of the ends thereof. Each of the elbow fittings is in turn arranged to be received over the end extremity 26 of one of the lateral support members 11, 12 (see FIG. 2). These fittings are not, however, bonded to the lateral support members. Instead, means are provided for temporarily connecting the elbows 25, and hence the end frame sections 13, 14, to the lateral supports. In the illustrated arrangement, this consists of a retaining spring member 27, which is fixed to the elbow 25 and extends for a short distance alongside the lateral support members 11 or 12. The extending portions 28 of the spring members may be provided with a short pin 29, receivable in an aperture 30 in the tubing, so that the end members 13, 14 of the frame are normally securely locked to the lateral supports 11, 12. They can be quickly and easily released, however, by simply lifting away the free ends 28 of the retaining springs and separating the elbows 25 from the end extremities 26 of the lateral supports.

At one or more locations on the frame structure there are mounted cross member assemblies comprising transversely extending sections 31 of PVC tubing mounting T-shaped fittings 32 at each end. The T-shaped fittings 32, like the previously described T-shaped fittings 17, 18, have their cross bar portions 33 internally machined to be of generally uniform diameter throughout for slidable reception on the spaced lateral supports 11, 12 (see FIG. 2). To advantage, the cross members 31 are permanently secured at one end to the stem portion 34 of the T-shaped fittings. At the opposite end, the T-shaped fitting may either be loosely received on the cross member or removably secured thereto by means of a thumbscrew 35 or the like.

Each of the T-shaped fittings 32 for the cross member assemblies is provided with a thumbscrew or similar means 36 mounted on the end sleeve 33 of the fitting, for engagement with the lateral supports 11, 12. The arrangement is such, with the thumbscrews 36 loosened, the cross member assemblies may be adjustably positioned longitudinally along the lateral supports 11, 12. When properly positioned, the thumbscrews 36 may be tightened to retain the cross bars in their adjusted positions.

On each cross member 31 there are positioned a plurality of tubular sleeves 37. These may advantageously be standard pipe couplings available for the PVC tubing modified, however, by internal machining so that the internal bore is large enough to be slideably received over the tubing of the cross member 31. Each sleeve is provided with a thumbscrew 38 or the like for securing the sleeve in any preadjusted position along the length of the cross member.

On each of the sleeves 37 there is a bracket 39 carrying a mount 40 for a suction device 41. The number and location of the sleeves 37 on the cross members 31 is determined by the size and type of packages to be picked up by the gripper, and is subject to easy adjustment and reconfiguration. Each of the suction mounts 40 is connected via a suction tube 42 to a controllable suction source (not shown) so that suction can be controllably applied to the suction devices 41, preferably on an individual basis.

In accordance with one aspect of the invention, the end members 13, 14 of the frame are provided with hingably mounted L-shaped flap assemblies 45. The flap assemblies include generally downwardly extending confining flaps 46, advantageously constructed of highly perforated, lightweight material, such as aluminum. The confining flaps 46 are secured by hinge assemblies 47, attached to the frame end elements 13, 14, and are actuated between generally vertical (closed) positions and outwardly divergent (open) positions by means of fluid actuating cylinders 48 mounted on the frame elements 13, 14 and joined to the flaps by pivoted connecting links. The confining flaps 46 are provided along their lower edge extremities with inwardly extending bottom plates 49, formed of thin, highly flexible spring steel material. The spring steel bottom plates extend generally at right angles inward from the confining flaps 46. The projecting length of the bottom plates 49 is such that, when the confining flaps 46 are pivoted to their open positions (see FIG. 3) the projecting end extremities of the bottom plates 49 lie approximately vertically below the frame end elements 13, 14. Accordingly, when the flap assemblies 45 are opened, the entire gripper may be lowered over an assembled group of packages for engagement therewith.

Figure 3:
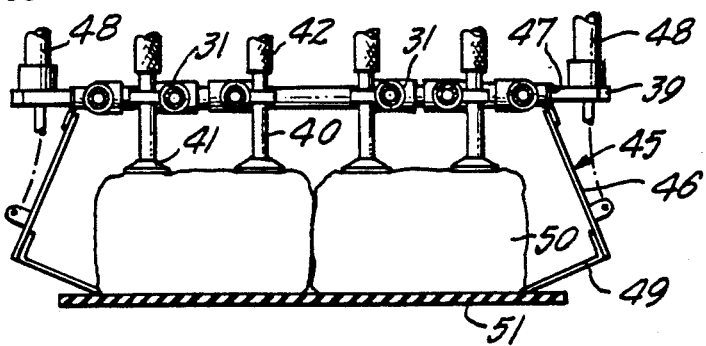
FIG. 3 is a side elevational view of the gripper of FIG. 1, showing the manner in which a series of packages are gripped in preparation for relocation and reorientation.

In the arrangement illustrated in FIG. 3, for example, a series of packages 50 (e.g., loaves of bread) are arranged on a conveyor belt 51 or other support. With the end flap assemblies 45 in their open positions, the gripper device may be lowered over the assembled group of packages until the suction devices 41 come into contact with the upper portions of the packages. Thereafter, suction is applied to the various suction devices and the actuators 47 are operated to pivot the end flap assemblies 45 to their closed positions, extending generally vertically downward from their hinge supports 47.

As is evident in FIG. 3, when the gripper frame is initially lowered over the package group, the end edges of the flexible bottom plates 49 will engage the conveyor or support 51 and, if necessary, will flex slightly in an upward direction. Thereafter, when the end flap assemblies 45 are closed inwardly, the plates 49, flexing as necessary, will slide underneath the packages at each end of the frame, to provide support from underneath.

With suction applied, and the end flaps 45 closed, the gripper may be rapidly accelerated upwardly and moved horizontally, accompanied by rotational reorientation if necessary, in order to position the package group over the waiting shipping tray or basket.

One of the important features of the invention resides in the facility with which it may be reconfigured in order to accommodate pattern packaging of different sizes and types of packages. In the bakery industry, for example, the shipping baskets or trays are of a generally standardized size and shape, and the basic frame structure of the gripper device may be appropriately dimensioned such that, when it is fully loaded with product items, it has a sufficient number thereof to constitute a full shipping basket load. In some cases, this might constitute six packages. In other cases, it might constitute ten or twelve packages. In any case, the orientation of the packages may vary significantly because optimum tray loading may require some package items to be oriented at 90° to others. Also, where the product items are packaged in plastic bags, the "tails" of the bags may desirably be oriented toward the center of the shipping tray.

To accommodate a wide variety of product patterns and product number in a single gripper, the gripper of the invention may be quickly disassembled and reconfigured. For example, either of the end frame elements 13, 14 may be removed by releasing the end clips 27. This allows cross members 31 to be added to or removed from or repositioned on the lateral supports 11, 12. Likewise, the cross members may be temporarily removed from the frame assembly, the T-shaped fitting 32 at one end removed, and suction devices either added to or removed from the cross member. In the illustration of FIG. 1, for example, the cross member mounts two suction devices. By removing first the frame end members 13, 14, and then sliding the cross members off of the lateral supports 11, 12, additional suction devices may be quickly added to some or all of the cross members after which they can be reinstalled on the supports 11, 12.

If it is necessary or desirable to install a cross member with suction devices in the center of the frame assembly, the T-shaped fittings 18 supporting one side of the mounting plate 15 can be removed temporarily from the lateral supports 11, 12, allowing a cross member to be installed between the T-shaped fittings 17, 18, after which the fittings 18 may be reinstalled on the supports.

As will be readily apparent, assembly and disassembly of the gripper device of the invention can be accomplished in a relatively few minutes, enabling the device to be completely reconfigured to accommodate a change in product packages being delivered.

The device of the invention, being constructed largely of simple sections of commercially available rigid PVC tubing, is both lightweight and strong, and thus is ideally suited for withstanding the relatively high acceleration forces imparted by a programmed robotic transfer system.

The controllably closable L-shaped end flaps are provided with highly flexible bottom plates, arranged to function in spatula-like fashion to slide underneath the product packages at each end, when the gripper is moved into position to engage a product group. The gripper is thus able to execute rapid accelerations while still maintaining complete control over product packages, in many cases consisting of products, such as bakery items, contained within plastic bags and thus likely to distort significantly under acceleration loading.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A light weight, re-configurable gripper for pick up, translational and rotational and rotational repositioning and deposit of a plurality of product items under robotic manipulation, which comprises
   (a) a basic frame comprising a pair of spaced, longitudinally extending lateral supports formed of lightweight tubular material, and means rigidly interconnecting said lateral supports,
   (b) a plurality of cross members slidably supported by and extending between said lateral supports,
   (c) said cross members being formed of lightweight tubular material and mounting a T-shaped fitting at each end,
   (d) said T-shaped fittings being tightly secured to said cross members and slidably mounted on said lateral supports for adjustable positioning of the cross members,
   (e) a plurality of clamping members slidably mounted on said cross members for adjustable positioning thereon,
   (f) a suction device mounted on each of said clamping members for engagement with a product item to be transported.

2. Apparatus according to claim 1, further characterized by,
   (a) said means rigidly connecting said lateral supports comprising a mounting member positioned above said supports and extending therebetween,
   (b) a pair of vertical spacer members extending upwardly from each of said lateral supports and connecting said mounting member, (c) said spacer members being connected at their lower ends to the stem portions of T-shaped spacer fittings, (d) the cross bar portions of said T-shaped spacer fittings being received over said lateral supports, (e) at least a first one of said T-shaped spacer fittings on each side being slidably movable on its lateral support, and (f) at least a second one of said T-shaped spacer fittings on each side being securable in fixed relation to its lateral support.

3. Apparatus according to claim 2, further characterized by (a) said second T-shaped spacer fittings being fixed to said lateral supports, (b) said first T-shaped spacer fittings being removably mounted on said lateral supports to enable selective positioning of a cross member between said first and second T-shaped spacer fittings.

4. Apparatus according to claim 1, further characterized by (a) said means rigidly interconnecting said lateral supports comprising end frame elements extending transversely between the ends of said lateral supports.

(b) detachable coupling means joining said end frame elements to said lateral supports, enabling removal of said end frame elements, (c) said cross members being adapted to be installed on or removed from said lateral supports when said end frame elements are detached therefrom.

5. Apparatus according to claim 4, further characterized by (a) said detachable coupling means comprising elbow fittings for joining said tubular elements, (b) said end frame elements being rigidly secured to an elbow fitting at each end, (c) the elbow fittings on each end frame element being slidably receivable over end portions of said lateral supports and releasably engageable therewith.

6. Apparatus according to claim 1, further characterized by (a) end flap means pivotally mounted on said frame and each including a generally downwardly extending confining plate and a generally horizontally extending supporting plate mounted at the lower extremity of said confining plate, (b) actuator means for controllably retracting said end flap means to accommodate lowering of said gripper over a group of product items, (c) said supporting plates being formed of a thin, flexible material and arranged to be inserted underneath portions of packages being engaged by said gripper 7. A light weight, re-configurable gripper for pick up, translational and rotational repositioning and deposit of a plurality of product items, arranged in said predetermined orientations and positions on a supporting surface, under robotic manipulation, which comprises (a) a generally rectangular basic frame comprising a pair of spaced-apart, longitudinally extending lateral supports of lightweight tubular material, and spaced-apart means rigidly interconnecting said lateral supports, (b) a plurality of lightweight tubular cross members individually slidably support by and longitudinally adjustable on and extending between said lateral supports, (c) means including T-shaped fittings at the ends of each of said cross members engaging said lateral supports for supporting and securing said cross members in their respective individually adjusted positions on said lateral supports, (d) individual suction devices mounted on each of said cross members, and individually slideably adjustable laterally thereon for engagement with said product items, as arranged in said predetermined orientations and positions, to be transported by said gripper, (e) each of said cross members being adapted to be slideably installed on and removed from said lateral supports of re-configuring said gripper, and (f) said T-shaped fittings being removable from at least one end of each of said cross members to render said one end accessible when removed from its lateral support to accommodate slidable addition or removal of individual suction devices from said cross members.

8. In a robotic gripper assembly for pick up, translational and rotational repositioning and deposit of a plurality of product items positioned on a supporting surface, and which comprises a frame for attachment to a robotic manipulator, a plurality of suction devices adjustably mounted on said frame, and confining flap means providing lateral support for product items during transportation thereof by said gripper assembly, the improvement in said confining flat means characterized by, (a) said flap means comprises flap members of generally L-shaped configuration, each including a generally downwardly extending member and a generally horizontally extending flexible supporting plate, (b) means for pivotally mounting said flat members in opposed arrangement on spaced portions of said frame, with said flexible supporting plates extending generally toward each other, (c) actuator means for pivotally moving said flap members into and out of product confining positions, (d) said flexible supporting plates underlying end portions of product items engaged by said gripper when said flap members are pivoted into product confining positions, and (e) said flexible supporting plates being deflectable by said supporting surface facilitate insertion underneath said product items.

9. A light weight, re-configurable gripper for pick up, transnational end rotational repositioning and deposit of a plurality of product items, arranged in said predetermined orientations and positions on a supporting surface, under robotic manipulation, which comprises (a) a generally rectangular basic frame comprising a pair of spaced-apart, longitudinally extending lateral supports, and spaced-apart means rigidly interconnecting said lateral supports, (b) a plurality of cross members individually slideably supported by and adjustable on and extending between said lateral supports, (c) means for securing said cross members in adjusted positions on said lateral supports, (d) a plurality of individual suction devices mounted on each of said cross members, and individually slideably adjustable laterally thereon for engagement with said product items, as arranged in said predetermined orientations and positions, to be transported by said gripper, (e) said cross members being adapted to be slideably installed on and removed from said lateral supports for reconfiguring said gripper, (f) at least one end of said cross members being accessible when removed from said lateral supports to accommodate slidable addition or removal of individual suction devices from said cross members, (g) L-shaped confining flap means pivotally mounted at each end of said gripper frame, (h) said confining flap means including flexible supporting plate means adapted to be inserted underneath end portions of product items in conjunction with operation of said suction devices by inward pivotal movement of said flap means, and (i) said flexible supporting plate means engaging and being deflectable by said supporting surface to facilitate insertion underneath said product items.

10. A light weight, re-configurable gripper for pick up, transnational and rotational repositioning and deposit of a plurality of product items, arranged in said predetermined orientations and positions on a supporting surface, under robotic manipulation, which comprises (a) a generally rectangular basic frame comprising a pair of spaced-apart, longitudinally extending lateral supports, and spaced-apart means rigidly interconnecting said lateral supports, (b) a plurality of cross members individually slideably supported by and adjustable on and extending between said lateral supports, (c) means for securing said cross members in adjusted positions on said lateral supports, (d) a plurality of individual suction devices mounted on each of said cross members, and individually slideably adjustable laterally thereon for engagement with said product items, as arranged in said predetermined orientations and positions, to be transported by said gripper, (e) said cross members being adapted to be slideably installed on and removed from said lateral supports for reconfiguring said gripper, (f) at least one end of said cross members being accessible when removed from said lateral supports to accommodate slidable addition or removal of individual suction devices from said cross members, (g) said lateral supports comprising elements of rigid tubular material, (h) said frame including end members of rigid tubular material, and (i) means releaseably connecting said end members to said lateral supports to accommodate removal of said end members for reconfiguration of said gripper.

11. Apparatus according to claim 10, further characterized by (a) said means releasably connecting said end members comprising tubular elbow fittings secured to said end members and releasably receivable over end portions of said lateral supports.

* * * * *